United States Patent [19]

Sarrand

[11] 4,177,450
[45] Dec. 4, 1979

[54] PROCESS AND METHOD TO INITIATE A RECEIVING AND TRANSMITTING STATION LINKED BY A CONNECTING CHANNEL OF AN INFORMATION EXCHANGE SYSTEM CONSISTING OF SEVERAL TRANSMITTING AND RECEIVING STATIONS

[75] Inventor: Pierre Sarrand, Fresnes, France

[73] Assignee: Compagnie Internationale pour l'Informatique Cii - Honeywell Bull (Societe Anonyme), Paris, France

[21] Appl. No.: 753,494

[22] Filed: Dec. 22, 1976

[30] Foreign Application Priority Data

Dec. 31, 1975 [FR] France .............................. 75 40365

[51] Int. Cl.² ............................................. H04Q 9/00
[52] U.S. Cl. ........................ 340/147 LP; 179/15 AL
[58] Field of Search ......... 340/147 LP, 168 S, 147 R; 179/15 AL

[56] References Cited

U.S. PATENT DOCUMENTS

| | | | |
|---|---|---|---|
| 3,644,901 | 2/1972 | Zingg | 340/168 S |
| 3,699,529 | 10/1972 | Beyers et al. | 445/1 |
| 3,755,786 | 8/1973 | Dixon et al. | 179/15 AL |
| 3,764,981 | 10/1973 | Takasugi | 340/147 LP |
| 3,978,451 | 8/1976 | Ito et al. | 340/147 LP |
| 4,085,448 | 4/1978 | Kogge | 340/147 R |
| 4,086,569 | 4/1978 | Pitches | 340/147 LP |

OTHER PUBLICATIONS

"Rapid Polling for Loops or Multidrop Systems with Priorities", T. F. Piatkowski, et al., *IBM Tech. Disclosure Bulletin*, vol. 16, No. 1, Jun. '73, pp. 306–307.

*Primary Examiner*—Donald J. Yusko
*Attorney, Agent, or Firm*—Cameron, Kerkam, Sutton, Stowell & Stowell

[57] ABSTRACT

A communications system in which control or access to a channel is distributed among the several transmitting-receiving station linked by the channel rather than being centralized or under a master station control.

7 Claims, 2 Drawing Figures

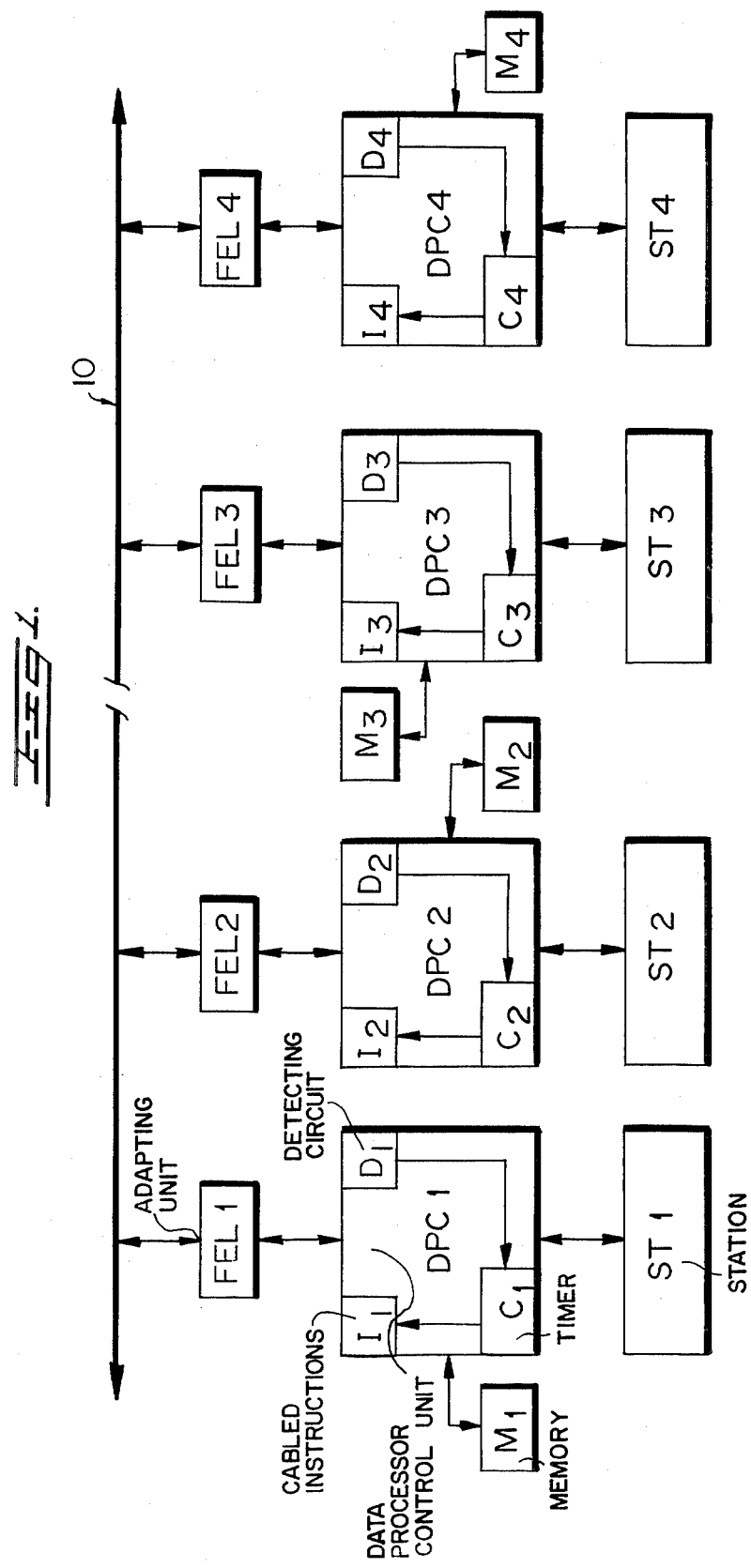

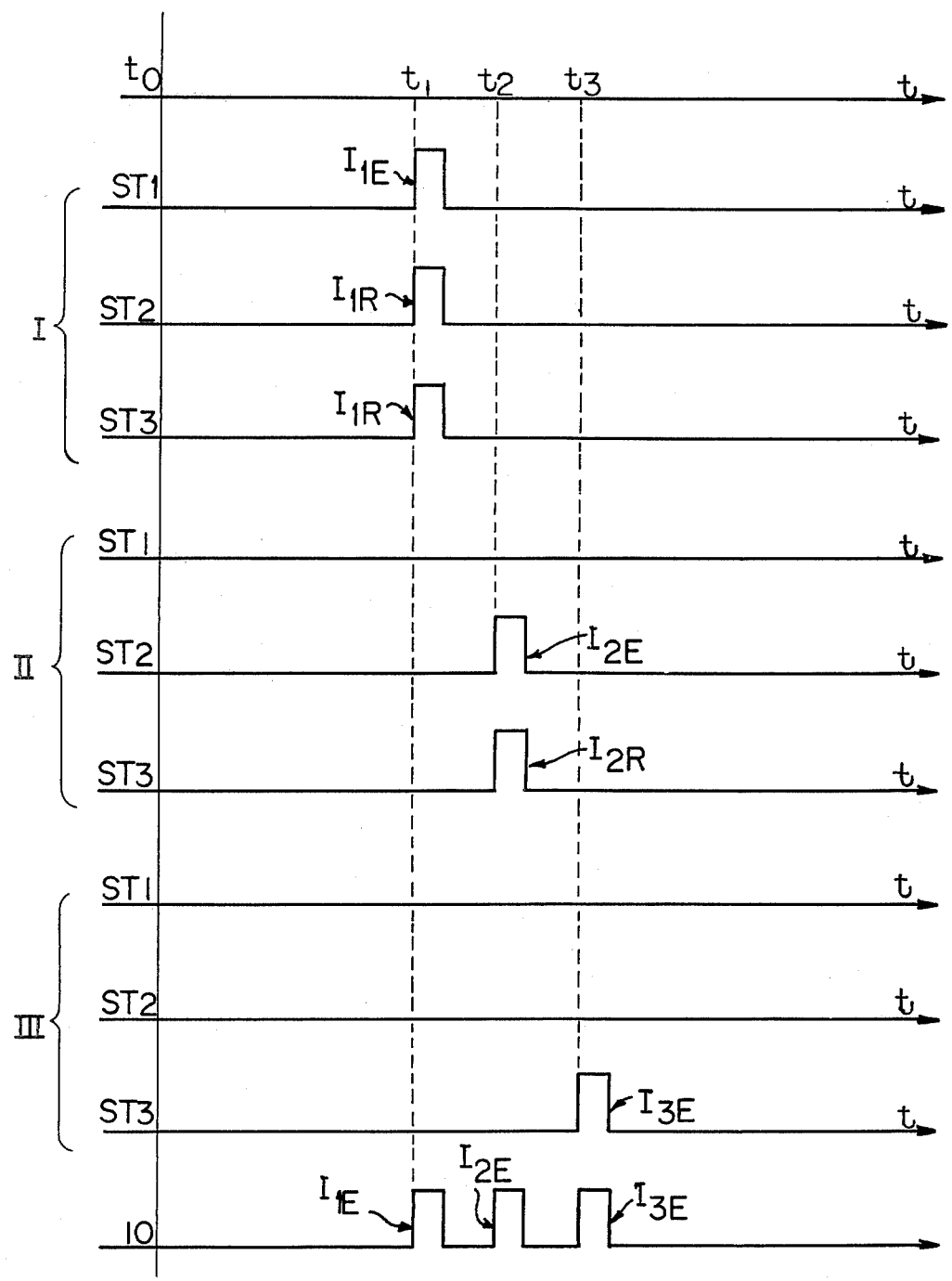

PROCESS AND METHOD TO INITIATE A RECEIVING AND TRANSMITTING STATION LINKED BY A CONNECTING CHANNEL OF AN INFORMATION EXCHANGE SYSTEM CONSISTING OF SEVERAL TRANSMITTING AND RECEIVING STATIONS

The invention relates to the exchange of information between several transmitting and receiving stations coordinated with a connecting channel linking the different stations. It relates in particular to a method and a process to control the connecting channel's activity and to initiate one of the stations, namely, after it has been activated. The information exchange system is of a decentralized type, which means that the connecting channel is not controlled by a specific station, but, receives its control from each station.

In order to better define the invention at the heart of this type of system, the mechanism of the system, its general operation and the type of information likely to flow in the connecting channel will first be briefly described.

One and only one station at a given moment assumes the control of the connecting channel by another station. The controlling station, prior to placing itself in a holding position, transmits a power maintenance message over the connecting channel and to the other station. Thus, an exchange of information or data is preceded by a message indicating effective control of the connecting channel by one of the stations to insure an information transfer with another station.

The station which has control over the connecting channel is defined as the "master" station. Once its control taking message is sent, prior to entering its holding position, it awaits an indication of the presence of activity on the connecting channel. If this latter information does not reach the master station in a predetermined time, the master station will transmit a message of effective or control maintenance to another station. Accordingly, if for some reason, the first station interrogated is inoperative, inactivated, non-existing or disconnected, the control taking message is sent to a second station.

If a master station is inoperative, it is impossible for it to control the connecting channel while simultaneously transmitting a message of control maintenance of the connecting channel to another station. Under such conditions, the whole system is maintained in abeyance or stand-by until service repair steps are taken to correct the inoperative master station.

The invention's aim is to solve this problem and to simultaneously insure permanent control over the connecting channel's activity, as well as the maintenance control message by any one of the stations in a way that can initiate one of the said stations at any given moment.

Thus, the invention relates to a procedure for initiating an information exchange system's receiving and transmitting stations linked by a connecting channel and is characterized by its ability to control, at each station, the connecting channel's activity by the detection of the presence in the connecting channel of information transmitted by one station to another station, and if the information fails to appear at the end of a prescribed time to cause to be transmitted on the connecting channel an initiation message towards one of the other stations.

According to another object of the invention a prescribed time for effective take over control of the connecting channel is set at each station. This predetermined time period establishes a time schedule for each station which differs from that assigned to other stations.

According to another object of the invention, upon activation of the system, control of the connecting channel is given to the station whose prescribed time for effective take over control of the connecting channel is the shortest. The invention also proposes to implement the method of information exchange by including at each station means for detecting, at a prescribed time, the appearance of information traveling on the connecting channel at the end of the prescribed time to ensure transmittal on the channel of an initiation message towards another station.

According to another object of the invention, the previously mentioned control implementation scheme consists of circuits for implementing instructions or programs previously recorded in a memory at each station.

Other advantages, characteristics and details will appear more clearly with the help of the following explanatory description which refers to the appendexed drawings given only as examples and in which:

FIG. 1 represents a diagram of an information exchange system between several stations linked by a connecting channel which allows the control maintenance of the channel and the initiation of any one of the stations.

FIG. 2 schematically illustrates, in graphic form, the relative timing sequence of the control signals of the system for the control takeover of the connecting channel by one of the stations during the activation of the system.

In accordance with the present invention there is provided an information exchange system having several transmitting and receiving stations coordinated by a connecting channel, linking the different stations. At any given moment, in principle, only one station should retain control over the connecting channel while the channel's activity, that is, the presence of information on the channel is determined by a set of stations. It is possible for the station retaining control over the connecting channel to transfer control to another station; and according to the invention, if that station is unable to actualize this command, another station may be initiated or hooked-up and thus insure a continuity of information flow on the linking channel.

Referring to FIG. 1, the exchange information system of the present invention consists of several stations, four of which are shown by way of illustration in the drawings. These stations are identified as ST1, ST2, ST3, ST4 and are linked by a common connecting channel 10 which provides for transfer of information between the stations.

Each station ST1 through ST4 is linked to the connecting channel 10 through a data processor control unit DPC1, DPC2, DPC3, DPC4, each having an associated adapting unit FEL1, FEL2, FEL3, FEL4 of a known type interconnecting the associated controll unit and channel. Each data processing unit or controller includes detection means for enabling the detection at each station of information which flows through the connecting channel 10. Detecting means or circuits D1, D2, D3, D4 are connected to associated cyclical meters or timers C1, C2, C3, C4 within the controller. Each data processing unit also includes a group of instructions identified as block $I_1$, $I_2$, $I_3$, and $I_4$. The instructions or program as the case may be are applied to the data processing unit under the control of timers $C_1$, $C_2$, $C_3$, $C_4$ so as to enable each station to transmit a maintenance control or takeover message to one of the other stations. Obviously, different circuits can be associated with each station according to the system being considered. For example, a live memory M1, M2, M3, M4 may be associated at each data processing unit controller DPC1, DPC2, DPC3, DPC4 to facilitate the exchange of information between the stations. The adapting units, the data processor or control unit with associated memories and the stations are per se well known in the art as shown in the U.S. Pat. No. 3,400,371 of Amdahl et al, issued Sept. 3, 1968.

The sequence of operation of invention will be described in connection with the timing scheme of FIG. 2. Given the fact that at initiation of the system, there is no specific control station which has control and management of the connecting channel 10, the manner by which one of these stations takes over control over the connecting channel when the system is activated will now be described under three different operating conditions.

1. First Case (I)

As indicated by the portion marked I of FIG. 2, at time $T_0$, let it be assumed that the system includes three stations ST1, ST2, ST3 which are operating and that three time schedules, respectively, $T_1$, $T_2$, $T_3$ are prescribed to the stations. When the stations are initially activated, at time $t_0$, no information flows on connecting channel 10. Timers $C_1$, $C_2$, $C_3$ of stations ST1, ST2, ST3, respectively, begin counting at time $t_0$. The prescribed time schedules $T_1$, $T_2$, $T_3$ are each different by predetermined arrangement. $T_1$ is the shortest time period, $T_2$ the next longest followed by $T_3$. Thus, when the timer C1, of station ST1 has counted a corresponding amount of impulses to time $t_1$, the timer $C_1$ will trigger the implementation of execution of cabled instructions $I_1$ in the data processing control unit of DPC1. The implementation or execution of these instructions corresponds with the control maintenance of connecting channel 10 by station ST1 and their implementation enables the transmitted information $I_{1E}$ to be sent to connecting channel 10. This information is received by stations ST2, ST3, the received information being labeled $I_{1R}$. Stations ST2 and ST3 detect the appearance of information ($I_{1R}$) on connecting channel 10 according to their prescribed times $T_2$ and $T_3$, prior to the end of the time period. If the system is in proper operating order after activation, station ST1 takes over control of the connecting channel.

2. Second Case (II)

As indicated in the portion II of FIG. 2, let it be assumed that station ST1, which has the shortest prescribed time schedule, is not in working order. This means that it is not possible for ST1 to transmit information in connecting channel 10 during time period $t_1$ assigned to it after activation of the system. Upon activation, information flows on connecting channel 10. Station ST1 is inactive, but station ST2 through its timer $C_2$, will count a number of impulses which correspond to its time period $t_2$. Not having detected $I_{1R}$ the presence of information, in the connecting channel, through its detector circuit $D_2$, it will maintain control of the connecting channel and carry out the cabled instructions $I_2$, which have been recorded within the data processing control unit DPC2. This causes information $I_{2E}$ to be transmitted which will be received by station ST3 as in the previous case. The received information at ST3 is designated $I_{2R}$. Thus, if station ST1 is inoperative, the station whose prescribed time is immediately greater than $T_1$ automatically takes control over the connecting channel.

3. Third Case (III)

As indicated in the portion III of FIG. 2, let it now be assumed that upon activation, stations ST1 and ST2 are inoperative, in other words, that they are unable to maintain control over connecting channel 10, and therefore unable to transmit any information. In this case, detector D3 fails to detect information during periods $t_3$ and station ST3 at the end of prescribed time $t_3$ will be activated to transmit information $I_{3E}$. This information indicates that ST3 has taken over control of the connecting channel, as a result of the implementation of cabled instructions $I_3$, recorded in data processing unit DPC3 under the command of its timer $C_3$. Thus, after the activation of the system, it is assured that at least one station will maintain control of the connecting channel, providing of course that at least one of the stations is operative.

Information items $I_{1E}$, $I_{2E}$, $I_{3E}$ are, for example, control messages for the initiation of a station addressed to transmit. The station transmitting this message prior to putting itself in a holding position awaits an acknowledgement of receipt from the station to which messages have been sent. The station receiving the message, in turn, takes control over the connecting channel 10 and insures information transfer with another station according to a prescribed message type or program which varies according to the system used.

During the course of operations, when the detection circuits $D_1$, $D_2$, $D_3$, $D_4$ detect the presence of information in linking channel 10, they automatically cause the count of timers $C_1$, $C_2$, $C_3$, $C_4$ to be set back to zero. This is necessary in order to reinitiate each time period from the latest information received.

In the exchange information system, to which the present invention is directed, connecting channel 10 is thus controlled by a scanning circuit comprising the detectors of the various stations. Each station is arranged to take control of the channel at any given moment which corresponds to a prescribed time period predetermined with respect to each station. In the absence of control being effected in the station with the shortest time schedule, the information passes to the next station where its detector allows that station to be activated to take over control.

It will be readily apparent to those skilled in the art that the invention is not in any way limited to the illustrative examples which have been presented by way of illustration only and it is intended that the invention encompass equivalent techniques of the type that have been described, if these are performed and implemented according to the following claims:

I claim:

1. A method for initiating an exchange of information between a receiving and transmitting station of an information exchange system having several receiving and transmitting stations linked to one another by a connecting channel over which initiation information is transmitted toward one of the stations, each of the stations including a timing means, said method comprising the steps of detecting said initiation information transmitted by one of said stations during a first schedule to thereby couple the one station to said connecting channel and initiating a timing period of a given duration by setting each of the timing means to start counting from a common reference point; determining each of the timing means to have its unique time schedule toward which each timing means counts, if the one station is inoperative and fails to detect the initiation information, permitting another of the stations having a second time schedule greater than the first time schedule to detect the initiation information and to couple the other station to the connecting channel.

2. The method in accordance with claim 1, wherein said method comprises the step of resetting each of said timing means to the common reference point upon activation of said station.

3. The method in accordance with claim 2, wherein there is included the step of previously recording instrsuctions in a memory at each of the stations, the recorded instructions for controlling the connecting of the station to the channel and transmitting on the said channel the initiation information.

4. Apparatus for the implementation of initiation of an exchange of information between a transmitting and receiving station of an exchange information system having several transmitting and receiving stations linked by a connecting channel, said apparatus comprising means within each station for detecting initiation information transmitted on said channel during a timing period, timing means within each station for counting from a common reference point to a count corresponding to a time schedule unique to each station, each of stations including means for coupling its station to said channel and means within each station for transmitting on said channel initiation information to another station should said initiation information on said channel fail to appear at the end of the time schedule of that station.

5. Apparatus according to claim 4, wherein said control means includes a memory in each of said stations for storing instructions, and circuit means for applying said instsructions to effect coupling of its station to and transmit a data message on said channel.

6. Apparatus in accordance with claim 5, wherein said timing means is set to the common reference point when the data message appears on said connecting channel.

7. Apparatus in accordance with claim 4, wherein said control means is responsive to said timing means associated with each of said stations when said timing means counts to its unique schedule time.

* * * * *